United States Patent
Zhao

(10) Patent No.: US 9,448,099 B2
(45) Date of Patent: Sep. 20, 2016

(54) SELF-WEIGHING TROLLEY CASE WITH WEIGHT SENSOR COMPOSED PARTIALLY OF SOFT MATERIAL

(71) Applicant: Zhejiang Keeplong Precision Machinery Co., Ltd., Pinghu Jiaxing, Zheijiang Province (CN)

(72) Inventor: Xuequn Zhao, Pinghu Jiaxing (CN)

(73) Assignee: Zhejiang Keeplong Precision Machinery Co., Ltd., Zhejiang (CN)

(*) Notice: Subject to any disclaimer, the term of this patent is extended or adjusted under 35 U.S.C. 154(b) by 138 days.

(21) Appl. No.: 14/397,450

(22) PCT Filed: May 3, 2013

(86) PCT No.: PCT/CN2013/075114
§ 371 (c)(1),
(2) Date: Jan. 28, 2015

(87) PCT Pub. No.: WO2014/005464
PCT Pub. Date: Jan. 9, 2014

(65) Prior Publication Data
US 2015/0129324 A1    May 14, 2015

(30) Foreign Application Priority Data

Jul. 4, 2012   (CN) .......................... 2012 2 0318211

(51) Int. Cl.
*G01G 19/52* (2006.01)
*G01G 19/58* (2006.01)
(Continued)

(52) U.S. Cl.
CPC ................. *G01G 19/58* (2013.01); *A45C 5/14* (2013.01); *A45C 15/00* (2013.01); *G01G 3/1402* (2013.01); *G01G 21/23* (2013.01)

(58) Field of Classification Search
CPC ........ A45C 5/14; A45C 13/28; A45C 15/00; G01G 19/52; G01G 19/58; G01G 3/1402; G01G 21/23
See application file for complete search history.

(56) References Cited

U.S. PATENT DOCUMENTS

| 4,433,741 A * | 2/1984 | Ryckman, Jr. ....... G01G 3/1402 177/199 |
| 4,800,973 A * | 1/1989 | Angel .................... G01G 19/44 177/210 C |

(Continued)

FOREIGN PATENT DOCUMENTS

| CN | 201021903 Y | 2/2008 |
| CN | 201518841 U | 7/2010 |

(Continued)

OTHER PUBLICATIONS

International Search Report dated Jul. 11, 2013 for International Application No. PCT/CN2013/075114.

*Primary Examiner* — Randy W Gibson
(74) *Attorney, Agent, or Firm* — Sheppard Mullin Richter & Hampton LLP

(57) ABSTRACT

A weighing case includes a trolley, a case body, a vertical handle, a horizontal handle, and wheels, where four weight sensing apparatuses are arranged on one side of the case body, and a display screen is arranged on the other side of the case body. The weighing case in the present utility model can conveniently display the weight of goods in the case body because four weight sensing apparatuses are arranged on one side of the case body and a display screen is arranged on the other side of the case body. The present utility model has a simple structure and a strong practicability.

1 Claim, 3 Drawing Sheets

(51) Int. Cl.
*G01G 3/14* (2006.01)
*G01G 21/23* (2006.01)
*A45C 5/14* (2006.01)
*A45C 15/00* (2006.01)

(56) References Cited

U.S. PATENT DOCUMENTS

| | | | | |
|---|---|---|---|---|
| 6,563,059 | B2* | 5/2003 | Lee | G01G 19/44 177/177 |
| 6,838,624 | B2* | 1/2005 | Chan | G01G 21/23 177/177 |
| 7,084,357 | B2* | 8/2006 | Roberts | A45C 15/00 177/131 |
| 7,439,456 | B2* | 10/2008 | Ogunnaike | A45C 13/00 177/148 |
| 7,692,107 | B1* | 4/2010 | Shotey | G01G 19/58 177/131 |
| 7,994,440 | B2* | 8/2011 | Oseko | G01G 3/1402 177/238 |
| 2004/0035610 | A1* | 2/2004 | Chan | G01G 21/23 177/25.11 |
| 2005/0217903 | A1* | 10/2005 | Roberts | A45C 15/00 177/245 |
| 2005/0217904 | A1* | 10/2005 | Hughes | A45C 15/00 177/245 |
| 2007/0205025 | A1* | 9/2007 | Taha | A45C 3/00 177/245 |
| 2011/0226534 | A1 | 9/2011 | Li | |

FOREIGN PATENT DOCUMENTS

| | | |
|---|---|---|
| CN | 201624240 U | 11/2010 |
| CN | 201709613 U | 1/2011 |
| CN | 201754873 U | 3/2011 |
| CN | 201806118 U | 4/2011 |
| CN | 202160853 U | 3/2012 |
| CN | 202233622 U | 5/2012 |
| CN | 202286807 U | 7/2012 |
| CN | 202714343 U | 2/2013 |
| CN | 202714344 U | 2/2013 |
| GB | 2433876 A | 7/2007 |
| WO | WO 8404027 A1 * | 10/1984 |
| WO | WO2014/005465 | 1/2014 |

* cited by examiner

SELF-WEIGHING TROLLEY CASE WITH WEIGHT SENSOR COMPOSED PARTIALLY OF SOFT MATERIAL

TECHNICAL FIELD

The present utility model relates to a case, and in particular, to a weighing case of a weighing function.

BACKGROUND

A trolley case is easy to carry. A trolley case in the prior art does not have a weighing function and is inconvenient in occasions such as an airport because there is a weight limitation on belongings.

SUMMARY

A purpose of the present utility model is to propose a weighing case meeting a measurement requirement to solve the foregoing problem.

The purpose of the present utility model is implemented as follows: The weighing case in the present utility model includes a trolley, a case body, a vertical handle, a horizontal handle, and wheels, where four weight sensing apparatuses are arranged on one side of the case body, and a display screen is arranged on the other side of the case body, the weight sensing apparatuses are connected to an input end of a control circuit by using a wire, the display screen is connected to an output end of the control circuit, the weight sensing apparatus includes a cavity formed by a base and a lid, a weight sensor is disposed in the cavity formed by the base and the lid, the middle of the lid is connected to a load-bearing support by using a soft material, and the load-bearing support is inset with a metallic plate.

The weighing case in the present utility model can conveniently display the weight of goods in the case body because four weight sensing apparatuses are arranged on one side of the case body and a display screen is arranged on the other side of the case body. The present utility model has a simple structure and a strong practicability.

DESCRIPTION OF EMBODIMENTS

Figure 1:
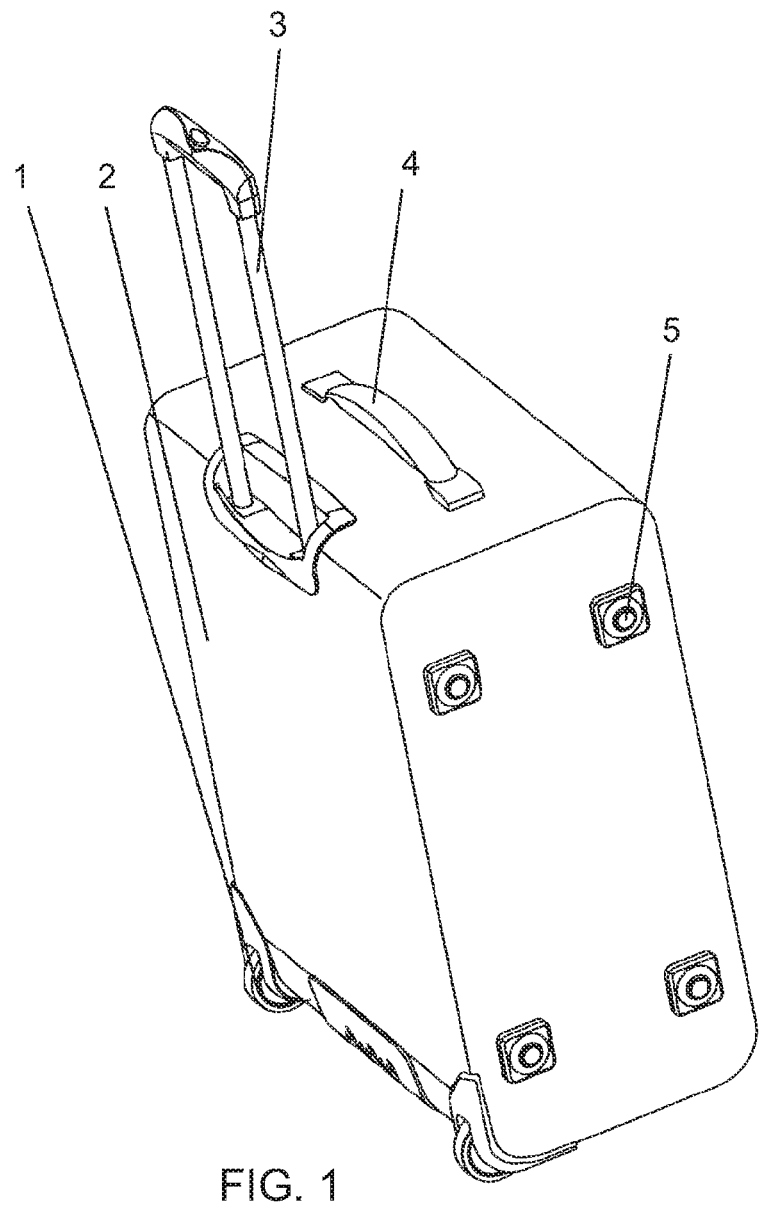
FIG. 1 is a schematic structural diagram of one side of a weighing case in the present utility model.
Figure 2:
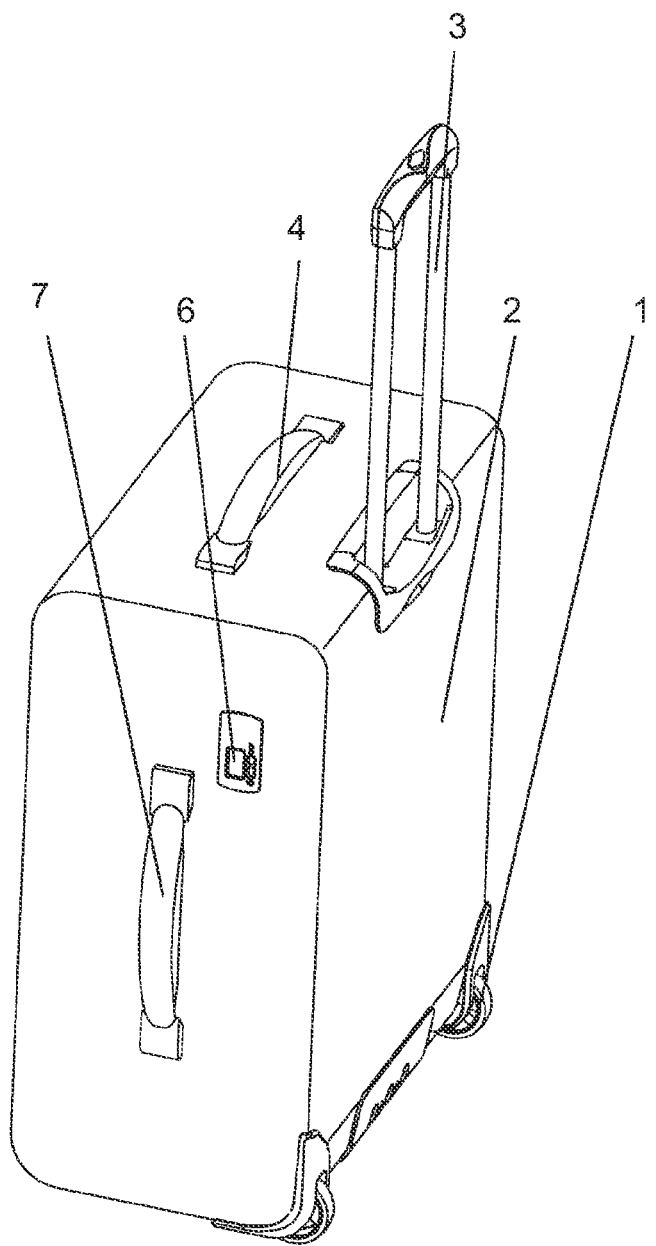
FIG. 2 is a schematic structural diagram of the other side of the weighing case in the present utility model.

The following further describes the present utility model by using embodiments with reference to the accompanying drawings:

As shown in FIG. 1 and FIG. 2, a weighing case in the present utility model includes a trolley 3, a case body 2, a vertical handle 4, a horizontal handle 7, and wheels 1, where four weight sensing apparatuses 5 are arranged on one side of the case body 2, and a display screen 6 is arranged on the other side of the case body 2.

Figure 3:
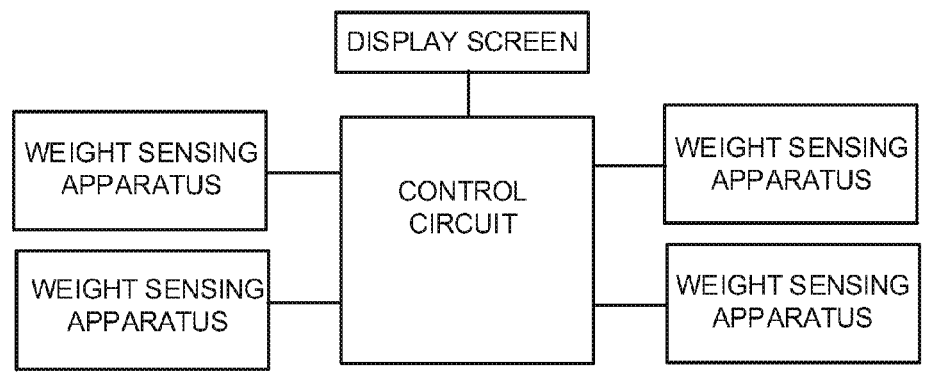
FIG. 3 is a working principle diagram of a circuit of the weighing case in the present utility model.
Figure 4:
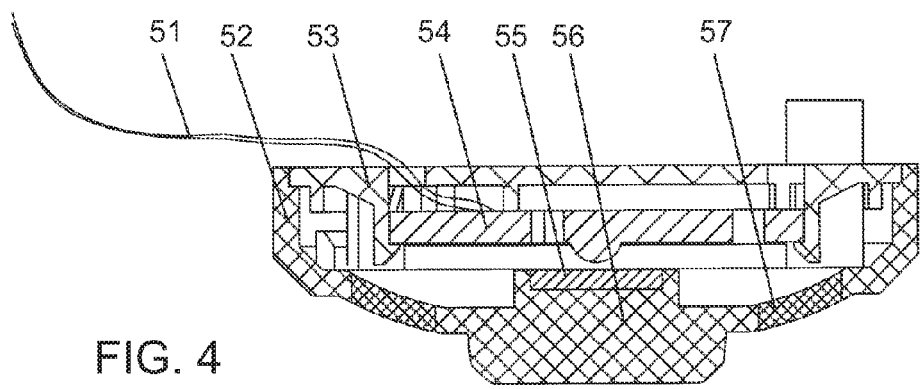
FIG. 4 is a schematic structural diagram of a weight sensing apparatus of the weighing case in the present utility model.

As shown in FIG. 3 and FIG. 4, the weight sensing apparatuses 5 are connected to an input end of a control circuit by using a wire 51, the display screen 6 is connected to an output end of the control circuit, the weight sensing apparatus 5 includes a cavity formed by a base 53 and a lid 52, a weight sensor 54 is disposed in the cavity formed by the base 53 and the lid 52, the middle of the lid 52 is connected to a load-bearing support 56 by using a soft material 57, and the load-bearing support 56 is inset with a metallic plate 55.

The invention claimed is:

1. A weighing case, comprising a trolley (3), a case body (2), a vertical handle (4), a horizontal handle (7), wheels (1), four weight sensing apparatuses (5) disposed on one side of the case body (2), and a display screen (6) disposed on another side of the case body (2), wherein the weight sensing apparatuses (5) are connected to an input end of a control circuit by using a wire (51), the display screen (6) is connected to an output end of the control circuit, the weight sensing apparatuses (5) each comprises a cavity formed by a base (53) and a lid (52), a weight sensor (54) is disposed in the cavity formed by the base (53) and the lid (52), the lid (52) is connected to a load-bearing support (56) by using a soft material (57), and the load bearing support (56) is inset with a metallic plate (55).

* * * * *